United States Patent
Bonakdar et al.

(10) Patent No.: US 12,330,217 B2
(45) Date of Patent: Jun. 17, 2025

(54) METHOD AND SYSTEM FOR OPTIMIZING PROCESS PARAMETERS IN AN ADDITIVE MANUFACTURING PROCESS

(71) Applicants: Siemens Energy Global GmbH & Co. KG, Munich (DE); University of Waterloo, Waterloo (CA)

(72) Inventors: Ali Bonakdar, Nuns Island (CA); Farzad Liravi, Kitchener (CA); Ehsan Toyserkani, Waterloo (CA); Usman Ali, Waterloo (CA); Shoja'edin Chenouri, Waterloo (CA); Yahya Mahmoodkhani, Waterloo (CA)

(73) Assignees: Siemens Energy Global GmbH & Co. KG, Munich (DE); University of Waterloo, Waterloo, CA (US)

( * ) Notice: Subject to any disclaimer, the term of this patent is extended or adjusted under 35 U.S.C. 154(b) by 789 days.

(21) Appl. No.: 17/599,392

(22) PCT Filed: Mar. 29, 2019

(86) PCT No.: PCT/US2019/024909
§ 371 (c)(1),
(2) Date: Sep. 28, 2021

(87) PCT Pub. No.: WO2020/204883
PCT Pub. Date: Oct. 8, 2020

(65) Prior Publication Data
US 2022/0176457 A1    Jun. 9, 2022

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 10/38* (2021.01); *B22F 12/41* (2021.01);
(Continued)

(58) Field of Classification Search
CPC .......... B22F 10/85; B22F 10/28; B22F 10/38; B22F 12/41; G05B 13/024;
(Continued)

(56) References Cited

U.S. PATENT DOCUMENTS

2002/0076818 A1* 6/2002 Vessey ............. G01N 35/00584
422/62
2008/0201117 A1 8/2008 Wong et al.
(Continued)

FOREIGN PATENT DOCUMENTS

CN 101334663 A 12/2008
CN 104085110 A 10/2014
(Continued)

OTHER PUBLICATIONS

Yin Junxia et al / Multi-objective optimization of cold extrusion process parameters for rectangle spline / Forging & Stamping Technology, 12 English machine translation attached.
(Continued)

*Primary Examiner* — Sally A Merkling
*Assistant Examiner* — Danny N Kang

(57) ABSTRACT

A method is provided for determining optimal values of significant process parameters in an additive manufacturing (AM) process for printing a part from a specified process material. The method involves defining a set of target output material properties to be optimized and identifying an initial set of process parameters pertaining to the AM process. The method broadly comprises a screening phase and an optimization phase. The screening phase involves generating
(Continued)

and executing a first experiment design, and determining, based on a first output response, a subset of significant process parameters that affect the target output material properties. The optimization phase involves generating and executing a second experiment design, and determining, based on a second output response, optimal values for the significant process parameters that maximize or minimize the target output material properties.

12 Claims, 6 Drawing Sheets

(51) Int. Cl.
    *B22F 10/38*     (2021.01)
    *B22F 12/41*     (2021.01)
    *B33Y 10/00*     (2015.01)
    *B33Y 50/02*     (2015.01)
    *G05B 13/02*     (2006.01)

(52) U.S. Cl.
    CPC ............ *G05B 13/024* (2013.01); *B33Y 10/00* (2014.12); *B33Y 50/02* (2014.12); *G05B 2219/49023* (2013.01)

(58) Field of Classification Search
    CPC ...... G05B 2219/49023; G05B 19/4099; B33Y 10/00; B33Y 50/02; Y02P 10/25
    See application file for complete search history.

(56) References Cited

U.S. PATENT DOCUMENTS

| | | | |
|---|---|---|---|
| 2015/0331402 A1 | 11/2015 | Lin et al. | |
| 2015/0360288 A1 | 12/2015 | Zalewski | |
| 2018/0053346 A1 | 2/2018 | Grbic et al. | |
| 2018/0071868 A1* | 3/2018 | Goehler | B29C 64/153 |
| 2018/0079149 A1 | 3/2018 | Suresh et al. | |
| 2018/0356778 A1 | 12/2018 | Acharya et al. | |

FOREIGN PATENT DOCUMENTS

| | | |
|---|---|---|
| CN | 104281098 A | 1/2015 |
| CN | 106073788 A | 11/2016 |
| CN | 106510893 A | 3/2017 |
| CN | 106599462 A | 4/2017 |
| CN | 107839240 A | 3/2018 |
| CN | 108746615 A | 11/2018 |
| CN | 109128168 A | 1/2019 |
| EP | 1191312 A2 | 3/2002 |
| WO | 03093406 A2 | 11/2003 |
| WO | 2014074947 A2 | 5/2014 |
| WO | 2017096050 A1 | 6/2017 |
| WO | 2018165381 A1 | 9/2018 |

OTHER PUBLICATIONS

Xie Lei et al / Optimization of process parameters combination for laser marking 2D barcode / China Metalforming Equipment & Manufacturing Technology, 01 / Feb. 28, 2014 English machine translation attached.

PCT International Search Report and Written Opinion of International Searching Authority mailed Dec. 18, 2019 corresponding to PCT International Application No. PCT/US2019/024909 filed Mar. 29, 2019.

* cited by examiner

| Run # | \multicolumn{23}{c}{Parameter Code} |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ | $X_{16}$ | $X_{17}$ | $X_{18}$ | $X_{19}$ | $X_{20}$ | $X_{21}$ | $X_{22}$ | $X_{23}$ |
| 1 | 1 | 1 | 1 | -1 | -1 | -1 | -1 | 1 | -1 | 1 | -1 | -1 | 1 | 1 | -1 | -1 | 1 | 1 | -1 | 1 | -1 | 1 | 1 |
| 2 | 1 | 1 | 1 | 1 | -1 | -1 | -1 | -1 | 1 | -1 | 1 | -1 | -1 | 1 | 1 | -1 | -1 | 1 | 1 | -1 | 1 | -1 | 1 |
| 3 | 1 | 1 | 1 | 1 | 1 | -1 | -1 | -1 | -1 | 1 | -1 | 1 | -1 | -1 | 1 | 1 | -1 | -1 | 1 | 1 | -1 | 1 | -1 |
| 4 | -1 | 1 | 1 | 1 | 1 | 1 | -1 | -1 | -1 | -1 | 1 | -1 | 1 | -1 | -1 | 1 | 1 | -1 | -1 | 1 | 1 | -1 | 1 |
| 5 | 1 | 1 | -1 | 1 | 1 | 1 | 1 | -1 | -1 | -1 | -1 | 1 | -1 | 1 | -1 | -1 | 1 | 1 | -1 | -1 | 1 | 1 | -1 |
| 6 | -1 | -1 | 1 | 1 | 1 | 1 | 1 | 1 | -1 | -1 | -1 | -1 | 1 | -1 | 1 | -1 | -1 | 1 | 1 | -1 | -1 | 1 | 1 |
| 7 | 1 | 1 | -1 | 1 | 1 | 1 | 1 | 1 | 1 | -1 | -1 | -1 | -1 | 1 | -1 | 1 | -1 | -1 | 1 | 1 | -1 | -1 | 1 |
| 8 | 1 | 1 | -1 | -1 | 1 | 1 | 1 | 1 | 1 | 1 | -1 | -1 | -1 | -1 | 1 | -1 | 1 | -1 | -1 | 1 | 1 | -1 | -1 |
| 9 | -1 | 1 | 1 | -1 | 1 | -1 | 1 | 1 | 1 | 1 | 1 | -1 | -1 | -1 | -1 | 1 | -1 | 1 | -1 | -1 | 1 | 1 | -1 |
| 10 | -1 | 1 | 1 | -1 | 1 | -1 | 1 | 1 | 1 | 1 | 1 | -1 | -1 | -1 | -1 | 1 | -1 | 1 | -1 | -1 | 1 | 1 | 1 |
| 11 | 1 | -1 | -1 | 1 | 1 | -1 | 1 | -1 | 1 | 1 | 1 | 1 | 1 | -1 | -1 | -1 | 1 | -1 | 1 | -1 | -1 | 1 | 1 |
| 12 | 1 | -1 | 1 | -1 | 1 | 1 | -1 | 1 | -1 | 1 | 1 | 1 | 1 | -1 | -1 | -1 | -1 | 1 | -1 | 1 | -1 | 1 | -1 |
| 13 | -1 | 1 | -1 | -1 | 1 | 1 | -1 | 1 | -1 | 1 | 1 | 1 | 1 | 1 | -1 | -1 | -1 | 1 | -1 | 1 | -1 | 1 | -1 |
| 14 | -1 | 1 | -1 | 1 | -1 | -1 | 1 | 1 | -1 | 1 | -1 | 1 | 1 | 1 | 1 | -1 | -1 | -1 | 1 | -1 | 1 | -1 | 1 |
| 15 | 1 | -1 | -1 | 1 | -1 | -1 | 1 | 1 | -1 | 1 | -1 | 1 | 1 | 1 | 1 | -1 | -1 | -1 | 1 | -1 | 1 | 1 | -1 |
| 16 | -1 | -1 | 1 | -1 | 1 | -1 | 1 | 1 | -1 | 1 | 1 | -1 | 1 | 1 | 1 | 1 | -1 | -1 | -1 | 1 | -1 | -1 | 1 |
| 17 | 1 | 1 | -1 | -1 | -1 | 1 | 1 | -1 | -1 | 1 | 1 | -1 | 1 | -1 | 1 | 1 | 1 | 1 | -1 | -1 | -1 | 1 | -1 |
| 18 | -1 | -1 | 1 | 1 | -1 | -1 | 1 | 1 | -1 | -1 | 1 | 1 | -1 | 1 | -1 | 1 | 1 | 1 | 1 | -1 | -1 | -1 | 1 |
| 19 | -1 | 1 | 1 | -1 | 1 | -1 | -1 | 1 | 1 | -1 | -1 | 1 | -1 | 1 | -1 | 1 | 1 | 1 | 1 | 1 | -1 | -1 | -1 |
| 20 | -1 | -1 | -1 | 1 | -1 | 1 | -1 | 1 | 1 | -1 | -1 | 1 | 1 | -1 | 1 | -1 | 1 | 1 | 1 | 1 | 1 | 1 | -1 |
| 21 | -1 | -1 | -1 | -1 | 1 | -1 | 1 | -1 | 1 | -1 | -1 | 1 | 1 | 1 | -1 | 1 | -1 | 1 | -1 | 1 | 1 | 1 | 1 |
| 22 | 1 | -1 | -1 | -1 | -1 | 1 | -1 | 1 | -1 | 1 | -1 | -1 | 1 | 1 | -1 | -1 | 1 | -1 | 1 | 1 | 1 | 1 | 1 |
| 23 | 1 | -1 | 1 | -1 | -1 | -1 | 1 | -1 | 1 | -1 | 1 | -1 | -1 | 1 | 1 | -1 | -1 | 1 | -1 | 1 | 1 | 1 | 1 |
| 24 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| 25 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 26 | 0 | 0 | 0 | 0 | 0 | 0 | 0 | 0 | 0 | 0 | 0 | 0 | 0 | 0 | 0 | 0 | 0 | 0 | 0 | 0 | -1 | 1 | 0 | 0 |
| 27 | 0 | 0 | 0 | 0 | 0 | 0 | 0 | 0 | 0 | 0 | 0 | 0 | 0 | 0 | 0 | 0 | 0 | 0 | 0 | 0 | 1 | -1 | 0 | 0 |
| 28 | 0 | 0 | 0 | 0 | 0 | 0 | 0 | 0 | 0 | 0 | 0 | 0 | 0 | 0 | 0 | 0 | 0 | 0 | 0 | 0 | -1 | -1 | 0 | 0 |
| 29 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 30 | 0 | 0 | 0 | 0 | 0 | 0 | 0 | 0 | 0 | 0 | 0 | 0 | 0 | 0 | 0 | 0 | 0 | 0 | 0 | 0 | -1 | 1 | 0 | 0 |
| 31 | 0 | 0 | 0 | 0 | 0 | 0 | 0 | 0 | 0 | 0 | 0 | 0 | 0 | 0 | 0 | 0 | 0 | 0 | 0 | 0 | 1 | -1 | 0 | 0 |
| 32 | 0 | 0 | 0 | 0 | 0 | 0 | 0 | 0 | 0 | 0 | 0 | 0 | 0 | 0 | 0 | 0 | 0 | 0 | 0 | 0 | -1 | -1 | 0 | 0 |
| 33 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 34 | 0 | 0 | 0 | 0 | 0 | 0 | 0 | 0 | 0 | 0 | 0 | 0 | 0 | 0 | 0 | 0 | 0 | 0 | 0 | 0 | -1 | 1 | 0 | 0 |
| 35 | 0 | 0 | 0 | 0 | 0 | 0 | 0 | 0 | 0 | 0 | 0 | 0 | 0 | 0 | 0 | 0 | 0 | 0 | 0 | 0 | 1 | -1 | 0 | 0 |
| 36 | 0 | 0 | 0 | 0 | 0 | 0 | 0 | 0 | 0 | 0 | 0 | 0 | 0 | 0 | 0 | 0 | 0 | 0 | 0 | 0 | -1 | -1 | 0 | 0 |

| Run # | Parameter Code | | | | | | | | |
|---|---|---|---|---|---|---|---|---|---|
| | 1 | 2 | 3 | 4 | 5 | 6 | 7 | 8 | 9 |
| | $X_{15}$ | $X_{16}$ | $X_{18}$ | $X_7$ | $X_5$ | $X_8$ | $X_{12}$ | $X_{10}$ | $X_{11}$ |
| 111 | -1 | 1 | 1 | 1 | -1 | 1 | 1 | -1 | -1 |
| 112 | 1 | 1 | 1 | 1 | -1 | 1 | 1 | 1 | -1 |
| 113 | -1 | -1 | -1 | -1 | 1 | 1 | 1 | -1 | 1 |
| 114 | 1 | -1 | -1 | -1 | 1 | 1 | 1 | 1 | 1 |
| 115 | -1 | 1 | -1 | -1 | 1 | 1 | 1 | -1 | -1 |
| 116 | 1 | 1 | -1 | -1 | 1 | 1 | 1 | 1 | -1 |
| 117 | -1 | -1 | 1 | -1 | 1 | 1 | 1 | 1 | -1 |
| 118 | 1 | -1 | 1 | -1 | 1 | 1 | 1 | -1 | -1 |
| 119 | -1 | 1 | 1 | -1 | 1 | 1 | 1 | 1 | 1 |
| 120 | 1 | 1 | 1 | -1 | 1 | 1 | 1 | -1 | 1 |
| 121 | -1 | -1 | -1 | 1 | 1 | 1 | 1 | 1 | 1 |
| 122 | 1 | -1 | -1 | 1 | 1 | 1 | 1 | -1 | 1 |
| 123 | -1 | 1 | -1 | 1 | 1 | 1 | 1 | 1 | -1 |
| 124 | 1 | 1 | -1 | 1 | 1 | 1 | 1 | -1 | -1 |
| 125 | -1 | -1 | 1 | 1 | 1 | 1 | 1 | -1 | -1 |
| 126 | 1 | -1 | 1 | 1 | 1 | 1 | 1 | 1 | -1 |
| 127 | -1 | 1 | 1 | 1 | 1 | 1 | 1 | -1 | 1 |
| 128 | 1 | 1 | 1 | 1 | 1 | 1 | 1 | 1 | 1 |
| 129 | -1 | 0 | 0 | 0 | 0 | 0 | 0 | 0 | 0 |
| 130 | 1 | 0 | 0 | 0 | 0 | 0 | 0 | 0 | 0 |
| 131 | 0 | -1 | 0 | 0 | 0 | 0 | 0 | 0 | 0 |
| 132 | 0 | 1 | 0 | 0 | 0 | 0 | 0 | 0 | 0 |
| 133 | 0 | 0 | -1 | 0 | 0 | 0 | 0 | 0 | 0 |
| 134 | 0 | 0 | 1 | 0 | 0 | 0 | 0 | 0 | 0 |
| 135 | 0 | 0 | 0 | -1 | 0 | 0 | 0 | 0 | 0 |
| 136 | 0 | 0 | 0 | 1 | 0 | 0 | 0 | 0 | 0 |
| 137 | 0 | 0 | 0 | 0 | -1 | 0 | 0 | 0 | 0 |
| 138 | 0 | 0 | 0 | 0 | 1 | 0 | 0 | 0 | 0 |
| 139 | 0 | 0 | 0 | 0 | 0 | -1 | 0 | 0 | 0 |
| 140 | 0 | 0 | 0 | 0 | 0 | 1 | 0 | 0 | 0 |
| 141 | 0 | 0 | 0 | 0 | 0 | 0 | -1 | 0 | 0 |
| 142 | 0 | 0 | 0 | 0 | 0 | 0 | 1 | 0 | 0 |
| 143 | 0 | 0 | 0 | 0 | 0 | 0 | 0 | -1 | 0 |
| 144 | 0 | 0 | 0 | 0 | 0 | 0 | 0 | 1 | 0 |
| 145 | 0 | 0 | 0 | 0 | 0 | 0 | 0 | 0 | -1 |
| 146 | 0 | 0 | 0 | 0 | 0 | 0 | 0 | 0 | 1 |
| 147 | 0 | 0 | 0 | 0 | 0 | 0 | 0 | 0 | 0 |
| 148 | 0 | 0 | 0 | 0 | 0 | 0 | 0 | 0 | 0 |
| 149 | 0 | 0 | 0 | 0 | 0 | 0 | 0 | 0 | 0 |
| 150 | 0 | 0 | 0 | 0 | 0 | 0 | 0 | 0 | 0 |
| 151 | 0 | 0 | 0 | 0 | 0 | 0 | 0 | 0 | 0 |
| 152 | 0 | 0 | 0 | 0 | 0 | 0 | 0 | 0 | 0 |
| 153 | 0 | 0 | 0 | 0 | 0 | 0 | 0 | 0 | 0 |
| 154 | 0 | 0 | 0 | 0 | 0 | 0 | 0 | 0 | 0 |
| 155 | 0 | 0 | 0 | 0 | 0 | 0 | 0 | 0 | 0 |
| 156 | 0 | 0 | 0 | 0 | 0 | 0 | 0 | 0 | 0 |

FIG. 8C

METHOD AND SYSTEM FOR OPTIMIZING PROCESS PARAMETERS IN AN ADDITIVE MANUFACTURING PROCESS

BACKGROUND

1. Field

The present invention relates to additive manufacturing, and in particular, to a method and system for optimizing process parameters in an additive manufacturing process.

2. Description of the Related Art

Industrial use of metal additive manufacturing (AM) is becoming ever so common for manufacturing complex parts with high repeatability and performance. Use of AM technologies save time and resources, which are one of the advantages of AM over conventional manufacturing techniques.

As new materials enter the additive manufacturing world, it may be important to determine the optimal process parameters of an AM process to achieve the required objectives (properties) from the parts produced by the AM process. For example, a laser powder based AM process, such as laser powder-bed fusion (LPBF), may involve identifying a very large number of input process parameters for printing parts with required properties. These parameters may deal with, for example, laser variables such as power, velocity as well as other parameters such as layer thickness, part orientation, etc. Due to the large number of process parameters involved in this process, finding the optimal values of these process parameters may be challenging.

A first known approach to optimizing process parameters in an AM process involves using a random parameter approach with various parameter values to find the best parameters. Herein, a parametric study is performed to determine the effect of each parameter, where parameters are varied one by one while all other parameters are kept constant. Examples of this approach are disclosed in the following publications:

- B. Song, S. Dong, H. Liao, and C. Coddet, "Process parameter selection for selective laser melting of Ti6Al4V based on temperature distribution simulation and experimental sintering," Int. J. Adv. Manuf. Technol., vol. 61, no. 9-12, pp. 967-974, 2012;
- F. Wang, X. H. Wu, and D. Clark, "On direct laser deposited Hastelloy X: dimension, surface finish, microstructure and mechanical properties," Mater. Sci. Technol, vol. 27, no. 1, pp. 344-356, 2011; and
- D. Q. Zhang, Z. H. Liu, and C. K. Chua, "Investigation on forming process of copper alloys via Selective Laser Melting," High Value Manuf. Adv. Res. Virtual Rapid Prototyp. Proc. 6th Int. Conf. Adv. Res. Virtual Rapid Prototyping, Leir. Port. 1-5 October, 2013, p. 285, 2013.

A second known approach involves employing a random parameter approach and then using a statistical design with response surface to find the optimal parameters. Examples of this approach are disclosed in the following publications:

- N. Read, W. Wang, K. Essa, and M. M. Attallah, "Selective laser melting of AlSi10Mg alloy: Process optimisation and mechanical properties development," Mater. Des., vol. 65, pp. 417-424, 2015;
- P. B. Bacchewar, S. K. Singhal, and P. M. Pandey, "Statistical modelling and optimization of surface roughness in the selective laser sintering process," Proc. Inst. Mech. Eng. Part B J. Eng. Manuf., vol. 221, no. 1, pp. 35-52, 2007;
- A. I. Khaimovich, I. S. Stepanenko, and V. G. Smelov, "Optimization of Selective Laser Melting by Evaluation Method of Multiple Quality Characteristics," in IOP Conference Series: Materials Science and Engineering, 2018, vol. 302, no. 1, p. 12067; and
- M. H. Kunkel, A. Gebhardt, K. Mpofu, and S. Kallweit, "Statistical assessment of mechanical properties of selective laser melted specimens of stainless steel," Int. J. Adv. Manuf. Technol., June 2018.

Due to cost and time constraints, the above approaches may be applied to only a small number of process parameters. As AM processes allow the user to manipulate large number of process parameters, there exists a need to analyze the effect of these parameters in reaching the final optimal values.

SUMMARY

Briefly, aspects of the present invention relate to a method and system for determining and optimizing process parameters in an additive manufacturing process.

According to a first aspect, a method is provided for determining optimal values of significant process parameters in an additive manufacturing (AM) process for printing a part from a specified process material. The method includes defining a set of target output material properties to be optimized and identifying an initial set of process parameters pertaining to the AM process. The method includes a screening phase and an optimization phase. In the screening phase, a first plurality of experimental print runs is executed, based on a first experiment design applied to said initial set of process parameters. A first output response is obtained by measuring the target output material properties for each print run. Based on the first output response, from the initial set of process parameters, a subset of significant process parameters is determined that affect the target output material properties. In the optimization phase, a second plurality of experimental print runs is executed, based on a second experiment design applied to said subset of significant process parameters. A second output response is obtained by measuring the target output material properties for each print run. Based on the second output response, optimal values are determined for each significant process parameter in said subset of significant process parameters, for which a maximization or minimization of the target output material properties is predicted.

According to a second aspect, a computer-readable storage medium is provided that comprises computer executable instructions. When executed by at least one processor, the computer executable instructions perform a method as mentioned below. The method includes obtaining an initial set of process parameters and a set of target output material properties to be optimized, pertaining to an additive manufacturing (AM) process utilizing a specified process material. In a screening phase, the method includes generating a first experiment design applied to said initial set of process parameters and communicating a first set of instructions pertaining to the first experiment design, for executing a first plurality of experimental print runs. The method further includes obtaining a first output response by receiving a first set of measurement data comprising measured values of the target output material properties for each print run. The method then includes determining, from said initial set of process parameters, a subset of significant process parameters that affect the target output material properties, based on the first output response. In an optimization phase, the method includes generating a second experiment design applied said subset of significant process parameters and communicating a second set of instructions pertaining to the second experiment design, for executing a second plurality of experimental print runs. The method further includes obtaining a second output response by receiving a second set of measurement data comprising measured values of the target output material properties for each print run. The method then includes determining optimal values for each significant process parameter in said subset of significant process parameters, for which a maximization or minimization of the target output material properties is predicted, based on the second output response.

According to a third aspect, a system for additive manufacturing (AM) is provided for printing a part from a specified process material. The system includes a computation module, an AM module and a measurement module. The AM module is operationally coupled to the computational module, and is configured to print a part having a specified geometry by said AM process from said process material, in response to a set of instructions received from the computational module. The measurement module comprises one or more measurement devices for measuring output material properties of a part printed by the AM module. The computational module is configured to obtain a set of target output material properties to be optimized and an initial set of process parameters pertaining to the AM process. The system is configured to implement a screening phase, in which the computational module is configured to generate a first experiment design applied to said initial set of process parameters and communicate a first set of instructions to the AM module. The AM module is configured to execute a first plurality of experimental print runs based on the first set of instructions. The measurement module is configured to obtain a first set of measurement data by measuring the target output material properties for each print run. The computational module is configured to obtain a first output response based the first set of measurement data received from the measurement module and, based on the first output response, determine, from said initial set of process parameters, a subset of significant process parameters that affect the target output material properties. The system is further configured to implement an optimization phase, in which the computational module is configured to generate a second experiment design applied said subset of significant process parameters and communicate a second set of instructions to the AM module. The AM module is configured to execute a second plurality of experimental print runs based on the second set of instructions. The measurement module is configured to obtain a second set of measurement data by measuring the target output material properties of each print run. The computational module is configured to obtain a second output response based the second set of measurement data received from the measurement module and, based on the second output response, determine optimal values for each significant process parameter in said subset of significant process parameters, for which a maximization or minimization of the target output material properties is predicted.

BRIEF DESCRIPTION OF THE DRAWINGS

The invention is shown in more detail by help of figures. The figures show preferred configurations and do not limit the scope of the invention.

FIG. 7 includes Table 2 illustrating a two-level PB design for twenty-three process parameters $X_1, X_2 \ldots X_{23}$ with 12 center points.

FIG. 8A-8C includes Table 4 which illustrates a second experiment design according to the second example of CCD (FIG. 5) for the nine significant process parameters $X_5, X_6, X_7, X_{10}, X_{11}, X_{12}, X_{15}, X_{16}$ and $X_{18}$.

DETAILED DESCRIPTION

In the following detailed description of the preferred embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

As additive manufacturing (AM) processes offer a large number of process parameters, it is a major challenge to identify and optimize the most important process parameters that truly affect the materials properties of interest. Using conventional methods to find the optimum value for all of the process parameters may require a large amount of resources. The methods known currently provide a selection of very limited number of process parameters from a specific AM process and perform a conventional optimization. In addition, the currently known methods do not enable a systematic identification of the most significant process parameters. The known optimization methods only consider a small number of process parameters (typically in the range of 3-5). Based on knowledge of typical AM processes, it is recognized that there may be a much larger number of parameters that can potentially affect the quality and properties of printed components.

To address at least the above problems, the present inventors have developed a statistical and experimental methodology to determine the optimum AM process parameters in order to maximize or minimize certain defined target output material properties of the printed parts. Target output material properties may refer to physical, mechanical and apparent properties. Examples of output material properties that may be optimized include, for example, density, hardness, surface roughness, tensile strength, mechanical yield strength, stiffness, fatigue life, among others. The present method includes two phases, namely a screening phase for determining the most significant AM process parameters that affect a defined set of target output material properties, and an optimization phase that uses the results of the screening phase to determine optimal values for the significant process parameters for maximizing or minimizing the target output material properties. Breaking the problem into separate screening and optimization phases helps in the optimization of a large number of AM process parameters.

A non-limiting example embodiment of the present invention is described herein below. The illustrated embodiment pertains to a laser powder-bed fusion (LPBF) process. However, aspects of the present invention are not limited to any specific AM process and may be applied to various other AM processes, including many different powder layer based and non-layer based AM processes.

Figure 1:
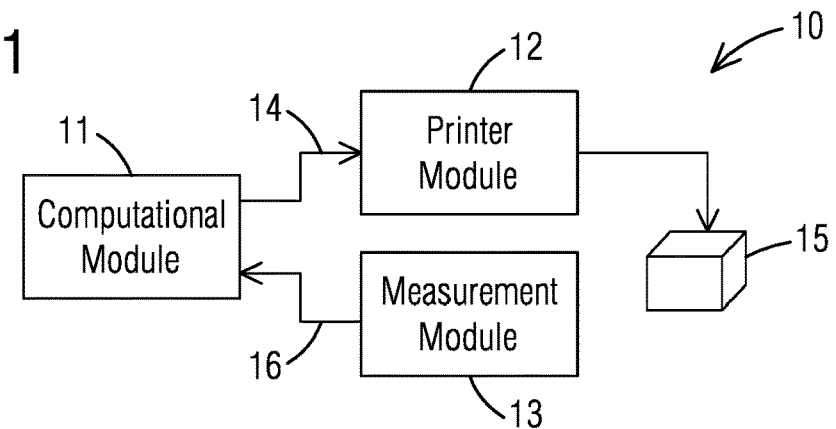
FIG. 1 is schematic block diagram of a system for implementing aspects of the present invention.

FIG. 1 is schematic block diagram of a system 10 for implementing aspects of the present invention. The system 10 broadly includes a computational module 11, an AM module 12 and a measurement module 13.

The computational module 11 may include at least one computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, such as a Personal Digital Assistant (PDA), or any other suitable portable or fixed electronic device. Also, a computer may have one or more input and output devices, as known to one skilled in the art. In some embodiments, the computational module 11 may include a plurality of computers interconnected by one or more networks in any suitable form, including as a local area network or a wide area network, such as an enterprise network or the Internet, including a cloud network. Such networks may be based on any suitable technology, may operate according to any suitable protocol and may include, for example, wireless networks, wired networks or fiber optic networks.

The various methods or processes executed by the computational module 11 may be coded as software that is executable on one or more processors that employ any one of a variety of operating systems or platforms. Additionally, such software may be written using any of several suitable programming languages and/or programming or scripting tools, and also may be compiled as executable machine language code or intermediate code that is executed on a framework or virtual machine.

The AM module 12 may comprise an apparatus configured for carrying out an additive manufacturing process, which, in this example, is an LPBF process. Specific components of such an apparatus are known to one skilled in the art and will not be further described here for the sake of brevity. The AM module 12 is communicatively coupled to the computational module 11, and is generally configured to print (i.e., to additively manufacture) a physical part 15 having a specified geometry by the AM process from a specified process material, in response to a set of instructions 14 received from the computational module 11. The set of instructions 14 for each print run may specify, for example, a geometry of the part to be printed (e.g. in the form of a CAD file) and values for process parameters to be used for that print run. In the illustrated embodiment, the process material comprises a commercially available Hastelloy X powder. However, one skilled in the art would appreciate that the choice of a specific process material is not germane to the described methodology and a variety of other process materials could be employed.

The measurement module 13 may comprise one or more sensors or measurement devices for measuring output material properties of a part 15 printed by the AM module 12, in particular, for measuring set of target output material properties that are to be controlled. As an example, surface roughness of a printed part may be measured by a confocal laser scanning microscope. Hardness of a printed part may be measured, for example, by penetrating an indenter into the printed part under a defined load and measuring a depth of penetration, with a defined number of repeats for each sample. Density of a printed part may be measured, for example, based on a temperature corrected Archimedes water displacement method. For measuring other output material properties, the choice of an appropriate measurement technique will be readily apparent to one skilled in the art.

The computational module 11 is configured to receive measurement data 16 from the measurement module 13, either manually or electronically, and utilize the measurement data 16 for further computation steps.

Figure 2:
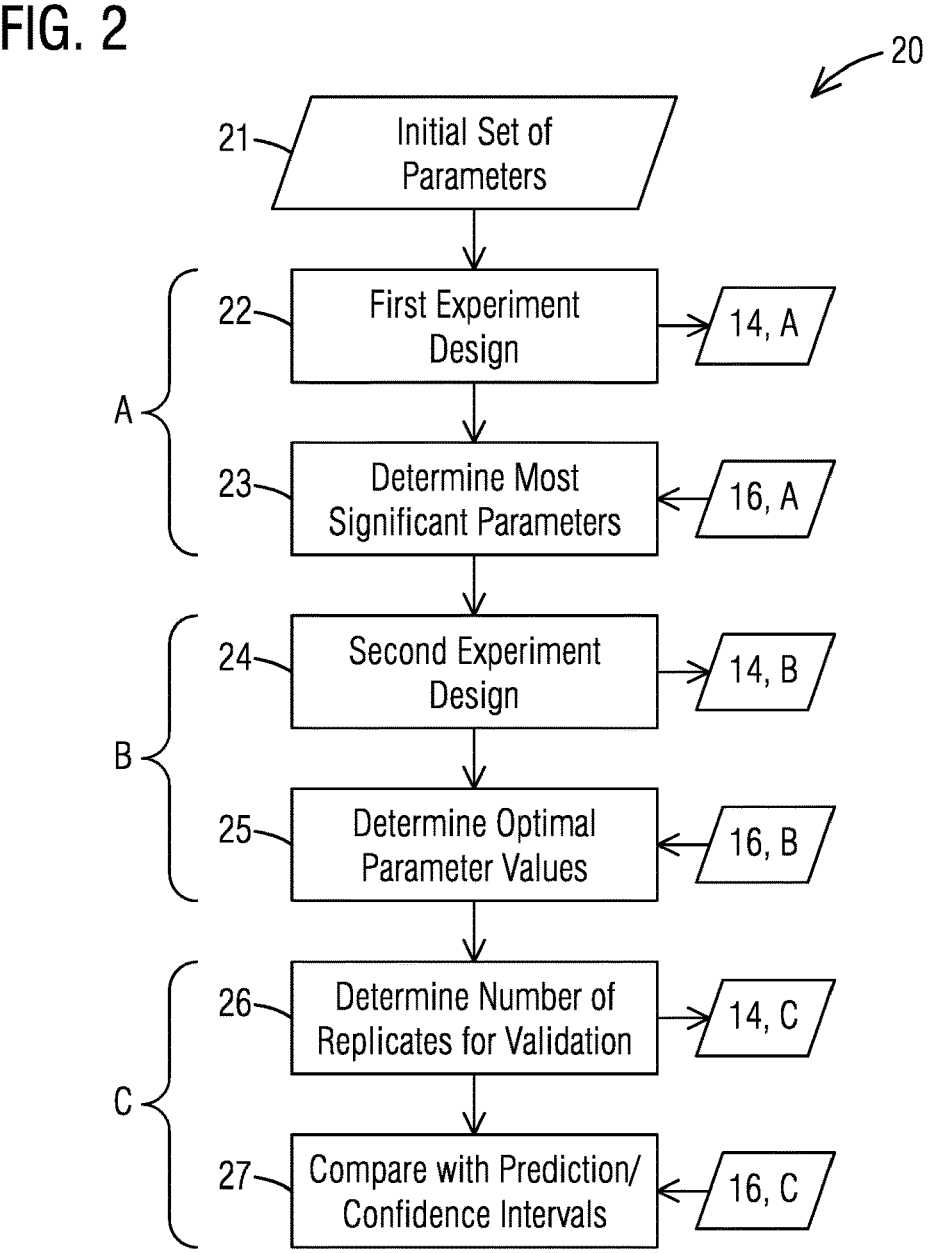
FIG. 2 is a flowchart illustrating a computer-implemented method for screening and optimizing process parameters in an AM process according an embodiment of the present invention.

Referring now to FIG. 2, a method 20 is illustrated in accordance with an embodiment of the present invention. The processing blocks of the method 20 may be executed by the computational module 11. The method 20 may be executed based on a specified process material and a defined set of target output material properties that are to be maximized or minimized. The process material, in this case, is a commercially available Hastelloy X powder. The set of target output material properties may include one or more physical, mechanical and apparent properties of a part to be printed. In the present example, the set of target output material properties include density, hardness and surface roughness. In other embodiments, fewer or more number of output material properties, or different target output material properties, may be considered. The process material and the set of target output material properties may be defined by way of a user input via a user interface. Alternately, either or both of the above may be predefined for a given execution of the method 20.

The method 20 broadly comprises a screening phase, designated as A, and an optimization phase, designated as B. As a desirable additional step, the method 20 may further comprise a validation phase, designated as C. The objective of the screening phase A is to determine the most significant process parameters which explain the observed variabilities in the output responses such as density, hardness and surface roughness of printed samples. These identified parameters would then be used in the optimization phase B to obtain the final optimal parameter values. The purpose of the validation phase C is to validate the optimized process parameter values with the expected or predicted output values of the responses, to evaluate the effectiveness of the optimization method and provide relevant confidence or prediction intervals.

With reference to FIG. 2, at block 21, an initial set of process parameters is obtained. As stated earlier, an AM process, particularly an LPBF process involve a large amount of process parameters which may influence the printed part quality. The initial set of process parameters obtained at block 21 may therefore include a large number of process parameters or all known process parameters for the given AM process. The initial set of process parameters may be identified, for example based on historical knowledge and expertise pertaining to the specific AM process. The initial set of process parameters may be available in an existing database or may be received by way of a user input via a user interface.

In an LPBF based printing process, for each layer, the laser performs a pre-scan of the border edges known as pre-exposure, it then scans the core (center area) of the part and then the skin (border area) of the part. Next, a final scan on the border edges is performed and is known as post-exposure. In the illustrated embodiment, the initial set of process parameters includes at least one of the following: a pre-exposure parameter, a post-exposure parameter, a core parameter and a skin parameter. Examples of pre-exposure process parameters include pre-exposure laser speed, pre-exposure laser power, among others. Examples of post-exposure process parameters include post-exposure laser speed, post-exposure laser power, among others. Examples of core process parameters include core width, core overlap, core hatch distance, among others. Examples of skin process parameters include skin width, skin overlap, skin hatch distance, among others.

Furthermore, besides the four categories of process parameters mentioned above, the initial set of process parameters may include additional process parameters. Examples of additional parameters include layer thickness, orientation, support structure parameters, among many others. Layer thickness defines the movement of the build bed to accommodate for more powder before the next laser scan. Orientation is defined by the angle relative to the build direction where 0° corresponds to vertical samples while 90° corresponds to horizontal samples. Print location is considered by defining a radius from the center of the build substrate. Support structures are often used in additive manufacturing to ease the part removal. Two parameters namely, support height and area spacing may be included in the initial set of process parameters to be analyzed. Support height defines the minimum height of the samples from the substrate, while support area spacing defines the solid volume fraction within the support structure.

Still further, the initial set of process parameters may also include qualitative parameters (i.e., which cannot be numerically quantified). Examples of qualitative process parameters include part geometry (e.g., cylinder, cube, etc.), hatching strategy (e.g., stripe, chess, etc.), among many others, since it is recognized that such parameters also affect the material properties of a printed part.

Referring back to FIG. 2, the screening phase A begins at processing block 22 by generating a first experiment design applied to the initial set of process parameters. The first experiment design may comprise, for example, a response surface based method. In the illustrated embodiment, the first experiment design includes a two-level Plackett-Burman (PB) design. Alternate examples of response surface based methods that can be used in the first experiment design may include a full factorial design, a fractional factorial design, or a central composite design, among others. The inventors have recognized that a two-level PB design is advantageous over other experimental designs as it involves fewer number of print runs for a large number of process parameters. The illustrated PB design involves at least a "low" level and a "high" level of each of the parameters of the initial set of process parameters. In the illustrated embodiment, the design additionally includes a plurality of center point based experimental print runs, involving a "mid" or intermediate level for at least some of the parameters of the initial set of process parameters. In an example embodiment, in the screening phase A, the "low", "mid" and "high" levels of the initial set of process parameters may be determined through analytical modeling It should be noted that qualitative parameters, such as part geometry and hatching strategy in this example, may not have any "mid" value. Table 1, which is provided below for illustrative purposes, shows a list of initial process parameters, designated as $X_1$, $X_2, \ldots X_n$, which have been categorized as pre-exposure, post-exposure, skin, core and additional parameters. Only some of the parameters have been described in detail in Table 1, it being understood that the parameters $X_1$, $X_2, \ldots X_n$ may include one or more of the parameters described above, or still other parameters. Table 1 also shows example "high", "mid" and "low" levels (values) for some of the parameters, it being understood that the values are non-limiting and meant for illustrative purposes only.

TABLE 1

| | # | Parameter | Description | Low | Mid | High |
|---|---|---|---|---|---|---|
| Pre-exposure Parameters | 1 | $X_1$ | Pre-exposure speed (mm/s) | 800 | 900 | 1000 |
| | 2 | $X_2$ | . . . | . . . | . . . | . . . |
| Post exposure Parameters | 3 | $X_3$ | Post exposure power (W) | 0 | 40 | 80 |
| | 4 | $X_4$ | . . . | . . . | . . . | . . . |
| Skin Parameters | 5 | $X_5$ | . . . | . . . | . . . | . . . |
| | 6 | $X_6$ | . . . | . . . | . . . | . . . |
| | 7 | $X_7$ | Skin hatch distance (mm) | 0.06 | 0.07 | 0.08 |
| | 8 | $X_8$ | . . . | . . . | . . . | . . . |
| | 9 | $X_9$ | . . . | . . . | . . . | . . . |
| Core Parameters | 10 | $X_{10}$ | Core speed (mm/s) | 900 | 1000 | 1100 |
| | 11 | $X_{11}$ | . . . | . . . | . . . | . . . |
| | 12 | $X_{12}$ | . . . | . . . | . . . | . . . |
| | 13 | $X_{13}$ | Core width (mm) | 2.5 | 3.5 | 4.5 |
| | 14 | $X_{14}$ | . . . | . . . | . . . | . . . |
| Additional Parameters | 15 | $X_{15}$ | . . . | . . . | . . . | . . . |
| | 16 | $X_{16}$ | Orientation (deg) | 0 | 45 | 90 |
| | 17 | $X_{17}$ | . . . | . . . | . . . | . . . |
| | 18 | $X_{18}$ | . . . | . . . | . . . | . . . |
| | 19 | $X_{19}$ | . . . | . . . | . . . | . . . |
| | 20 | $X_{20}$ | Geometry | cube | | cylinder |
| | 21 | $X_{21}$ | Hatching strategy | stripe | | chess |
| | 22 | $X_{22}$ | . . . | . . . | . . . | . . . |
| | 23 | $X_{23}$ | . . . | . . . | . . . | . . . |

A two-level PB design involving only "high" and "low" levels of the process parameters results in k+1 print runs, where k is the number of process parameters in the initial set of process parameters. In the illustrated embodiment, the initial set of process parameters includes 23 process parameters. The 23 parameters considered in the PB design would result in 24 runs. The illustrated embodiment involves 12 additional print runs involving center points. As part geometry and hatching strategy are qualitative parameters, they did not have center points. However, for a complete analysis, all other 21 parameters had center points that needed to be related to the qualitative parameters individually, thereby resulting in 12 center points. The total number of experimental print runs in this case is therefore 36. Center points allow a better estimate of the parameter effects and increase the degree of freedom of experimental design. In addition, center points may detect possible existing nonlinearity in the responses. Table 2, shown in FIG. 7, illustrates a two-level PB design for 23 process parameters $X_1, X_2, \ldots X_{23}$ with 12 center points, as per the present example. Herein, the "high", "mid" and "low" levels are indicated as 1, 0 and −1 respectively.

In one embodiment, the processing at block 23 may comprise performing a regression model fit of the measured output response of the first plurality of experimental print runs in relation to the process parameters of the initial set of process parameters. In the illustrated example embodiment, which is non-limiting, model fitting and data analysis may be done using regression analysis in R. For a detailed understanding on this subject, reference may be made to the following document: R Core Team, "R: A Language and Environment for Statistical Computing." Vienna, Austria,

TABLE 2

| | | | | | | | | | | | Parameter code | | | | | | | | | | | | |
|---|---|---|---|---|---|---|---|---|---|---|---|---|---|---|---|---|---|---|---|---|---|---|---|
| Run # | 1 $X_1$ | 2 $X_2$ | 3 $X_3$ | 4 $X_4$ | 5 $X_5$ | 6 $X_6$ | 7 $X_7$ | 8 $X_8$ | 9 $X_9$ | 10 $X_{10}$ | 11 $X_{11}$ | 12 $X_{12}$ | 13 $X_{13}$ | 14 $X_{14}$ | 15 $X_{15}$ | 16 $X_{16}$ | 17 $X_{17}$ | 18 $X_{18}$ | 19 $X_{19}$ | 20 $X_{20}$ | 21 $X_{21}$ | 22 $X_{22}$ | 23 $X_{23}$ |
| 1 | 1 | 1 | 1 | −1 | −1 | −1 | −1 | 1 | −1 | 1 | −1 | −1 | 1 | 1 | −1 | −1 | 1 | 1 | −1 | 1 | −1 | 1 | 1 |
| 2 | 1 | 1 | 1 | 1 | −1 | −1 | −1 | −1 | 1 | −1 | 1 | −1 | −1 | 1 | 1 | −1 | −1 | 1 | 1 | −1 | 1 | −1 | 1 |
| 3 | 1 | 1 | 1 | 1 | 1 | −1 | −1 | −1 | −1 | 1 | −1 | 1 | −1 | −1 | 1 | 1 | −1 | −1 | 1 | 1 | −1 | 1 | −1 |
| 4 | −1 | 1 | 1 | 1 | 1 | 1 | −1 | −1 | −1 | −1 | 1 | −1 | 1 | −1 | −1 | 1 | 1 | −1 | −1 | 1 | 1 | −1 | 1 |
| 5 | 1 | −1 | 1 | 1 | 1 | 1 | 1 | −1 | −1 | −1 | −1 | 1 | −1 | 1 | −1 | −1 | 1 | 1 | −1 | −1 | 1 | 1 | −1 |
| 6 | −1 | 1 | −1 | 1 | 1 | 1 | 1 | 1 | −1 | −1 | −1 | −1 | 1 | −1 | 1 | −1 | −1 | 1 | 1 | −1 | −1 | 1 | 1 |
| 7 | 1 | −1 | 1 | −1 | 1 | 1 | 1 | 1 | 1 | −1 | −1 | −1 | −1 | 1 | −1 | 1 | −1 | −1 | 1 | 1 | −1 | −1 | 1 |
| 8 | 1 | 1 | −1 | 1 | −1 | 1 | 1 | 1 | 1 | 1 | −1 | −1 | −1 | −1 | 1 | −1 | 1 | −1 | −1 | 1 | 1 | −1 | −1 |
| 9 | −1 | 1 | 1 | −1 | 1 | −1 | 1 | 1 | 1 | 1 | 1 | −1 | −1 | −1 | −1 | 1 | −1 | 1 | −1 | −1 | 1 | 1 | −1 |
| 10 | −1 | −1 | 1 | 1 | −1 | 1 | −1 | 1 | 1 | 1 | 1 | 1 | −1 | −1 | −1 | −1 | 1 | −1 | 1 | −1 | −1 | 1 | 1 |
| 11 | 1 | −1 | −1 | 1 | 1 | −1 | 1 | −1 | 1 | 1 | 1 | 1 | 1 | −1 | −1 | −1 | −1 | 1 | −1 | 1 | −1 | −1 | 1 |
| 12 | 1 | 1 | −1 | −1 | 1 | 1 | −1 | 1 | −1 | 1 | 1 | 1 | 1 | 1 | −1 | −1 | −1 | −1 | 1 | −1 | 1 | −1 | −1 |
| 13 | −1 | 1 | 1 | −1 | −1 | 1 | 1 | −1 | 1 | −1 | 1 | 1 | 1 | 1 | 1 | −1 | −1 | −1 | −1 | 1 | −1 | 1 | −1 |
| 14 | −1 | −1 | 1 | 1 | −1 | −1 | 1 | 1 | −1 | 1 | −1 | 1 | 1 | 1 | 1 | 1 | −1 | −1 | −1 | −1 | 1 | −1 | 1 |
| 15 | 1 | −1 | −1 | 1 | 1 | −1 | −1 | 1 | 1 | −1 | 1 | −1 | 1 | 1 | 1 | 1 | 1 | −1 | −1 | −1 | −1 | 1 | −1 |
| 16 | −1 | 1 | −1 | −1 | 1 | 1 | −1 | −1 | 1 | 1 | −1 | 1 | −1 | 1 | 1 | 1 | 1 | 1 | −1 | −1 | −1 | −1 | 1 |
| 17 | 1 | −1 | 1 | −1 | −1 | 1 | 1 | −1 | −1 | 1 | 1 | −1 | 1 | −1 | 1 | 1 | 1 | 1 | 1 | −1 | −1 | −1 | −1 |
| 18 | −1 | 1 | −1 | 1 | −1 | −1 | 1 | 1 | −1 | −1 | 1 | 1 | −1 | 1 | −1 | 1 | 1 | 1 | 1 | 1 | −1 | −1 | −1 |
| 19 | −1 | −1 | 1 | −1 | 1 | −1 | −1 | 1 | 1 | −1 | −1 | 1 | 1 | −1 | 1 | −1 | 1 | 1 | 1 | 1 | 1 | −1 | −1 |
| 20 | −1 | −1 | −1 | 1 | −1 | 1 | −1 | −1 | 1 | 1 | −1 | −1 | 1 | 1 | −1 | 1 | −1 | 1 | 1 | 1 | 1 | 1 | −1 |
| 21 | −1 | −1 | −1 | −1 | 1 | −1 | 1 | −1 | −1 | 1 | 1 | −1 | −1 | 1 | 1 | −1 | 1 | −1 | 1 | 1 | 1 | 1 | 1 |
| 22 | 1 | −1 | −1 | −1 | −1 | 1 | −1 | 1 | −1 | −1 | 1 | 1 | −1 | −1 | 1 | 1 | −1 | 1 | −1 | 1 | 1 | 1 | 1 |
| 23 | 1 | −1 | 1 | −1 | −1 | −1 | 1 | −1 | 1 | −1 | −1 | 1 | 1 | −1 | −1 | 1 | 1 | −1 | 1 | −1 | 1 | 1 | 1 |
| 24 | −1 | −1 | −1 | −1 | −1 | −1 | −1 | −1 | −1 | −1 | −1 | −1 | −1 | −1 | −1 | −1 | −1 | −1 | −1 | −1 | −1 | −1 | −1 |
| 25 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 26 | 0 | 0 | 0 | 0 | 0 | 0 | 0 | 0 | 0 | 0 | 0 | 0 | 0 | 0 | 0 | 0 | 0 | 0 | 0 | −1 | 1 | 0 | 0 |
| 27 | 0 | 0 | 0 | 0 | 0 | 0 | 0 | 0 | 0 | 0 | 0 | 0 | 0 | 0 | 0 | 0 | 0 | 0 | 0 | 1 | −1 | 0 | 0 |
| 28 | 0 | 0 | 0 | 0 | 0 | 0 | 0 | 0 | 0 | 0 | 0 | 0 | 0 | 0 | 0 | 0 | 0 | 0 | 0 | −1 | −1 | 0 | 0 |
| 29 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 30 | 0 | 0 | 0 | 0 | 0 | 0 | 0 | 0 | 0 | 0 | 0 | 0 | 0 | 0 | 0 | 0 | 0 | 0 | 0 | −1 | 1 | 0 | 0 |
| 31 | 0 | 0 | 0 | 0 | 0 | 0 | 0 | 0 | 0 | 0 | 0 | 0 | 0 | 0 | 0 | 0 | 0 | 0 | 0 | 1 | −1 | 0 | 0 |
| 32 | 0 | 0 | 0 | 0 | 0 | 0 | 0 | 0 | 0 | 0 | 0 | 0 | 0 | 0 | 0 | 0 | 0 | 0 | 0 | −1 | −1 | 0 | 0 |
| 33 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 34 | 0 | 0 | 0 | 0 | 0 | 0 | 0 | 0 | 0 | 0 | 0 | 0 | 0 | 0 | 0 | 0 | 0 | 0 | 0 | −1 | 1 | 0 | 0 |
| 35 | 0 | 0 | 0 | 0 | 0 | 0 | 0 | 0 | 0 | 0 | 0 | 0 | 0 | 0 | 0 | 0 | 0 | 0 | 0 | 1 | −1 | 0 | 0 |
| 36 | 0 | 0 | 0 | 0 | 0 | 0 | 0 | 0 | 0 | 0 | 0 | 0 | 0 | 0 | 0 | 0 | 0 | 0 | 0 | −1 | −1 | 0 | 0 |

Based on the design of the first experiment as illustrated above (Table 2), a first set of print instructions 14, A is generated, which may be communicated to the AM module 12. The first set of print instructions 14, A, in this case, specifies the number of experimental print runs (in this example, 36) and also specifies the level or value of each parameter $X_1, X_2, \ldots X_n$ in the initial set of process parameters for each print run, as illustrated in Table 2. Based on the first set of print instructions 14, A, the AM module 12 executes a first plurality of experimental print runs (in this example, 36 print runs). For each of these print runs, the defined set of target output material properties is measured at the measurement module 13. A first output response is thereby obtained from measurement data 16, A from the measurement module 13 pertaining to the first set of experimental print runs. Based on the first output response derived from the measurement data 16, A, the processing block 23 (see FIG. 2) involves determining, from the initial set of process parameters, a subset of significant process parameters that affect the target output material properties.

2013. In the present example. regression may be performed by fitting each response/output ($Y_i$) for input process parameters ($X_{ij}$) for factor (j).

After fitting the model and performing goodness of fit, several significance tests may be conducted to identify the most significant process parameters among all the process parameters. The hypothesis of no effect for each individual process parameter may be tested by computing a respective p-value. For a detailed understanding on the subject, reference may be made to the following document: C. F. J. Wu and M. Hamada, "Experiments: Planning, analysis, and parameter design optimization. 2000".

The p-values may be used as a measure to decide the significance of individual parameters. In this example, p-value of less than 5% or 10% is used to identify the most significant parameters. It should be noted that the closer the p-values are to zero, the higher the significance of the parameters.

In the present embodiment, for example, the above analysis may identify $X_{10}, X_{11}, X_{12}$ and $X_{15}$ as significant process parameters affecting density. $X_5$, $X_6$, $X_7$, $X_{15}$, $X_{16}$ and $X_{18}$ may be identified as significant process parameters affecting hardness. $X_5$, $X_{10}$, $X_{11}$ and $X_{15}$ may be identified as significant process parameters affecting surface roughness. In summary, the combination of these three analyses identifies a subset of 9 process parameters from the initial set of 23 process parameters. The 9 process parameters, namely: $X_5$, $X_6$, $X_7$, $X_{10}$, $X_{11}$, $X_{12}$, $X_{15}$, $X_{16}$ and $X_{18}$ are thereby determined to significantly affect the defined set of target output material properties, namely: density, hardness and surface roughness.

Next, in the optimization phase B, optimal values are determined for each of the significant process parameters determined in the screening phase A. The optimization phase B begins at processing block 24 by generating a second experiment design applied to the subset of significant process parameters which were determined at processing block 23. The second experiment design may comprise, for example, a response surface based method such as any of those mentioned above in connection with the first experiment design. In the present example, a full factorial design as applied to the set of 9 significant process parameters would result in $2^9=512$ runs. A fractional factorial design would result in reduced number of experimental print runs than a full factorial design. For example, a resolution VI fractional factorial design with 9 factors results in $2^{9-2}=128$ runs. To provide enhanced estimation quadratic effects, a central composite design (CCD) may be used.

Figure 3:
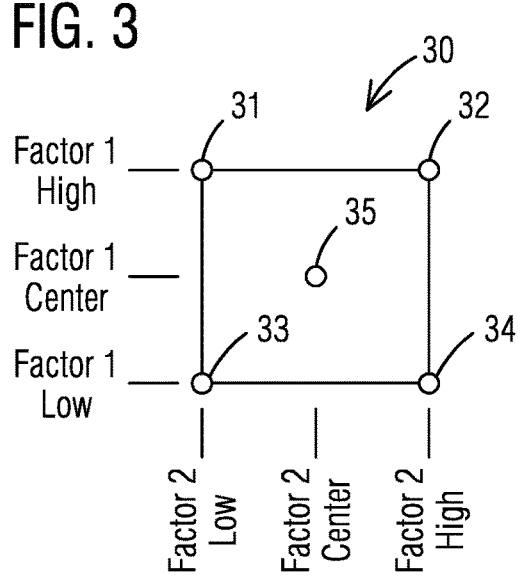
FIG. 3 illustrates an example of a factorial space in a fractional factorial design.
Figure 4:
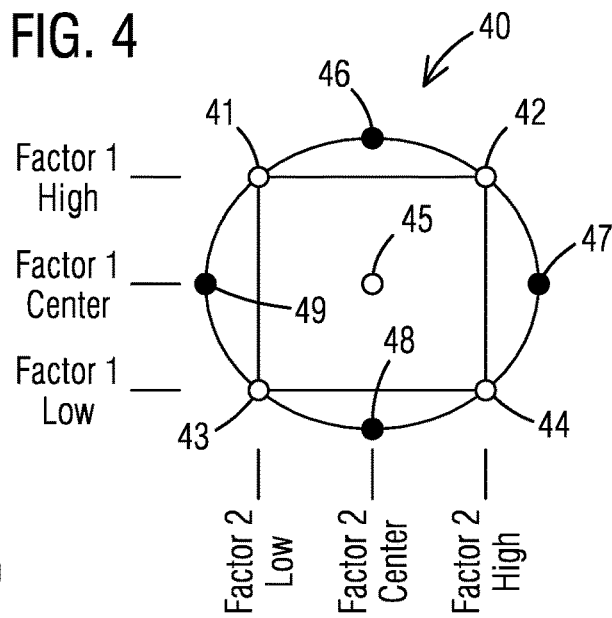
FIG. 4 illustrates an example of a factorial space in a first example of a central composite design.
Figure 5:
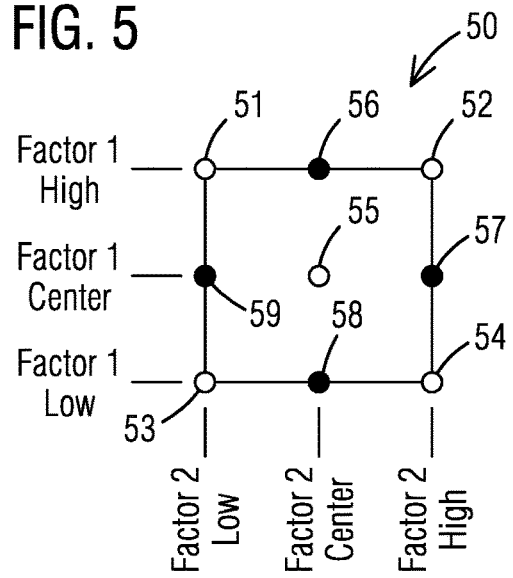
FIG. 5 illustrates an example of a factorial space in a second example of a central composite design.

The second experiment design may also involve three levels of each of the significant process parameters, defined respectively by a "high" level, a "mid" level and a "low" level. FIG. 3 illustrates a factorial space 30 for a two-factor fractional factorial design. Herein the factorial space 30 comprises four corner points 31, 32, 33, 34 which are defined by a combination of "high" and "level" levels of the factors (parameters), and further comprises a center point 35 defined by "mid" levels of the factors (parameters). FIG. 4 illustrates a factorial space 40 for a first example of a CCD. Herein the factorial space 40 comprises four corner points 41, 42, 43, 44 which are defined by a combination of "high" and "level" levels of the factors (parameters), a center point 45 defined by "mid" levels of the factors (parameters), and further comprises additional points 46, 47, 48, 49 that are outside the maximum and minimum levels of the factors (parameters). These additional points 46-49 are used for estimating curvature, and are typically calculated based on a multiple of ±1.414. In certain processes, values obtained from some of these additional points may not be accommodated. For example, the factor 1.414, when applied to laser power, may exceed the maximum allowable laser power for the AM process. A second example of a CCD is shown in FIG. 5. Herein the factorial space 50 comprises four corner points 51, 52, 53, 54 which are defined by a combination of "high" and "level" levels of the factors (parameters), a center point 55 defined by "mid" levels of the factors (parameters), and further comprises additional points 56, 57, 58, 59. In this case, the additional points 56-59 are located at the edges of the factorial space 50. The second example of CCD thus provides flexibility in accommodating the additional points 56-59 for estimating curvature while not exceeding allowable process limits.

While any of the designs illustrated in FIG. 3-5 can be used in designing the optimization experiments, the embodiment described herein employs the second CCD as shown in FIG. 5. The determined significant process parameters used for the CCD and their "low", "mid" and "high" values are shown in Table 3. Again, only some of the parameters have been described in detail and quantified in Table 3, it being understood that the parameters and their levels (values) are non-limiting and meant for illustrative purposes only.

TABLE 3

| | # | Parameter | Low | Mid | High |
|---|---|---|---|---|---|
| Additional Parameters | 1 | $X_{15}$ Layer thickness (mm) | 0.03 | 0.05 | 0.07 |
| | 2 | $X_{16}$ ... | ... | ... | ... |
| | 3 | $X_{18}$ ... | ... | ... | ... |
| Skin Parameters | 4 | $X_7$ Skin Hatch Distance (mm) | 0.05 | 0.06 | 0.07 |
| | 5 | $X_5$ ... | ... | ... | ... |
| | 6 | $X_6$ ... | ... | ... | ... |
| Core Parameters | 7 | $X_{12}$ ... | ... | ... | ... |
| | 8 | $X_{10}$ ... | ... | ... | ... |
| | 9 | $X_{11}$ Core Power (W) | 170 | 250 | 330 |

Figures 8A, 8B:
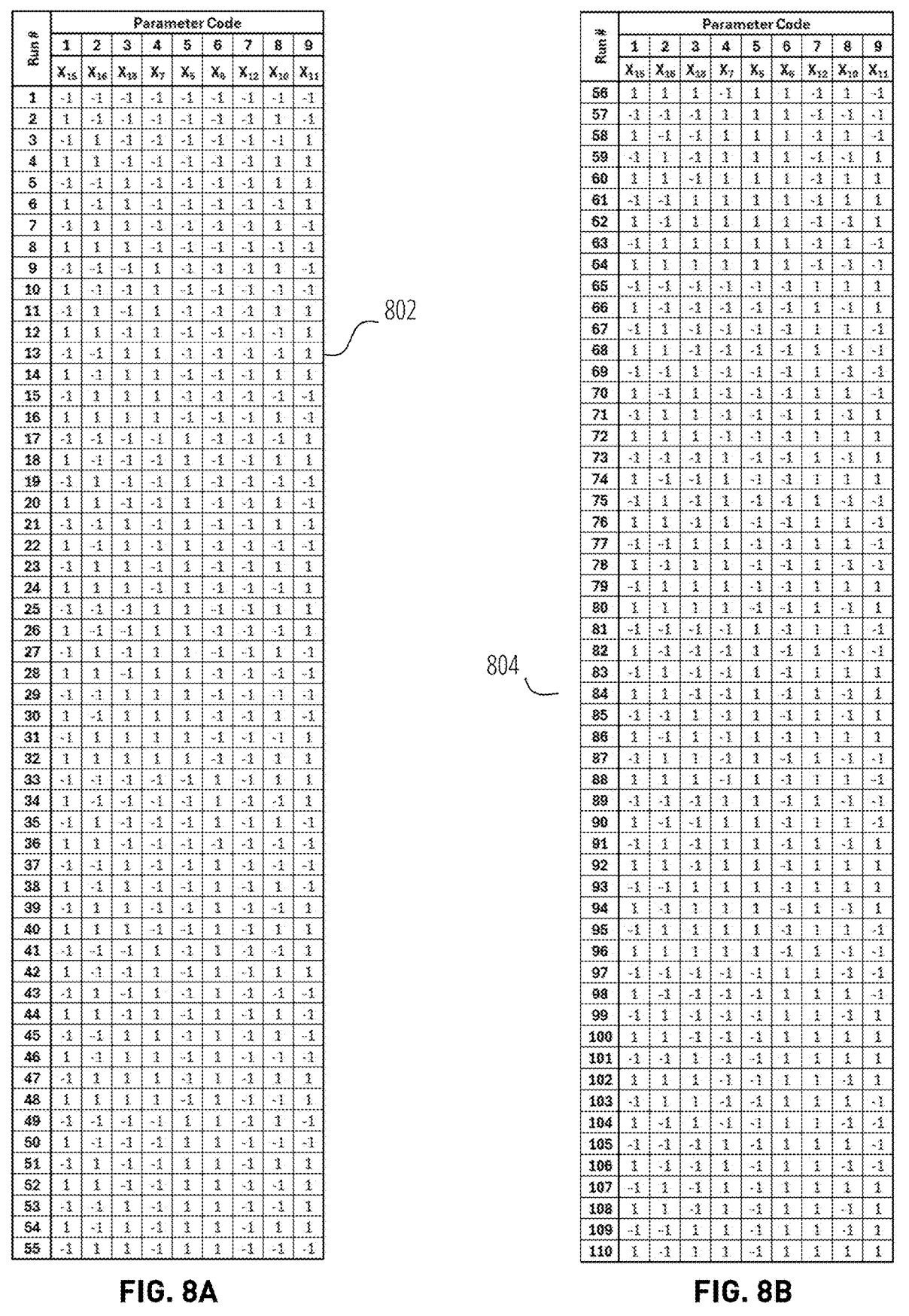

Table 4, shown in FIGS. 8A-8C, illustrates a second experiment design according to the second example of CCD (FIG. 5) for the 9 significant process parameters $X_5$, $X_6$, $X_7$, $X_{10}$, $X_{11}$, $X_{12}$, $X_{15}$, $X_{16}$ and $X_{18}$ as per the present example. Herein, the "high", "mid" and "low" levels are indicated as 1, 0 and −1 respectively.

TABLE 4

| | Parameter code | | | | | | | | |
|---|---|---|---|---|---|---|---|---|---|
| Run # | 1 $X_{15}$ | 2 $X_{16}$ | 3 $X_{18}$ | 4 $X_7$ | 5 $X_5$ | 6 $X_6$ | 7 $X_{12}$ | 8 $X_{10}$ | 9 $X_{11}$ |
| 1 | −1 | −1 | −1 | −1 | −1 | −1 | −1 | −1 | −1 |
| 2 | 1 | −1 | −1 | −1 | −1 | −1 | −1 | 1 | −1 |
| 3 | −1 | 1 | −1 | −1 | −1 | −1 | −1 | −1 | 1 |
| 4 | 1 | 1 | −1 | −1 | −1 | −1 | −1 | 1 | 1 |
| 5 | −1 | −1 | 1 | −1 | −1 | −1 | −1 | 1 | 1 |
| 6 | 1 | −1 | 1 | −1 | −1 | −1 | −1 | −1 | 1 |
| 7 | −1 | 1 | 1 | −1 | −1 | −1 | −1 | 1 | −1 |
| 8 | 1 | 1 | 1 | −1 | −1 | −1 | −1 | −1 | −1 |
| 9 | −1 | −1 | −1 | 1 | −1 | −1 | −1 | 1 | −1 |
| 10 | 1 | −1 | −1 | 1 | −1 | −1 | −1 | −1 | −1 |
| 11 | −1 | 1 | −1 | 1 | −1 | −1 | −1 | 1 | 1 |
| 12 | 1 | 1 | −1 | 1 | −1 | −1 | −1 | −1 | 1 |
| 13 | −1 | −1 | 1 | 1 | −1 | −1 | −1 | −1 | 1 |
| 14 | 1 | −1 | 1 | 1 | −1 | −1 | −1 | 1 | 1 |
| 15 | −1 | 1 | 1 | 1 | −1 | −1 | −1 | −1 | −1 |
| 16 | 1 | 1 | 1 | 1 | −1 | −1 | −1 | 1 | −1 |
| 17 | −1 | −1 | −1 | −1 | 1 | −1 | −1 | −1 | 1 |
| 18 | 1 | −1 | −1 | −1 | 1 | −1 | −1 | 1 | 1 |
| 19 | −1 | 1 | −1 | −1 | 1 | −1 | −1 | −1 | −1 |
| 20 | 1 | 1 | −1 | −1 | 1 | −1 | −1 | 1 | −1 |
| 21 | −1 | −1 | 1 | −1 | 1 | −1 | −1 | 1 | −1 |
| 22 | 1 | −1 | 1 | −1 | 1 | −1 | −1 | −1 | −1 |
| 23 | −1 | 1 | 1 | −1 | 1 | −1 | −1 | 1 | 1 |
| 24 | 1 | 1 | 1 | −1 | 1 | −1 | −1 | −1 | 1 |
| 25 | −1 | −1 | −1 | 1 | 1 | −1 | −1 | 1 | 1 |
| 26 | 1 | −1 | −1 | 1 | 1 | −1 | −1 | −1 | 1 |
| 27 | −1 | 1 | −1 | 1 | 1 | −1 | −1 | 1 | −1 |
| 28 | 1 | 1 | −1 | 1 | 1 | −1 | −1 | −1 | −1 |

TABLE 4-continued

| Run # | 1<br>$X_{15}$ | 2<br>$X_{16}$ | 3<br>$X_{18}$ | 4<br>$X_7$ | 5<br>$X_5$ | 6<br>$X_6$ | 7<br>$X_{12}$ | 8<br>$X_{10}$ | 9<br>$X_{11}$ |
|---|---|---|---|---|---|---|---|---|---|
| 29 | -1 | -1 | 1 | 1 | 1 | -1 | -1 | -1 | -1 |
| 30 | 1 | -1 | 1 | 1 | 1 | -1 | -1 | 1 | -1 |
| 31 | -1 | 1 | 1 | 1 | 1 | -1 | -1 | -1 | 1 |
| 32 | 1 | 1 | 1 | 1 | 1 | -1 | -1 | 1 | 1 |
| 33 | -1 | -1 | -1 | -1 | -1 | 1 | -1 | 1 | 1 |
| 34 | 1 | -1 | -1 | -1 | -1 | 1 | -1 | -1 | 1 |
| 35 | -1 | 1 | -1 | -1 | -1 | 1 | -1 | 1 | -1 |
| 36 | 1 | 1 | -1 | -1 | -1 | 1 | -1 | -1 | -1 |
| 37 | -1 | -1 | 1 | -1 | -1 | 1 | -1 | -1 | -1 |
| 38 | 1 | -1 | 1 | -1 | -1 | 1 | -1 | 1 | -1 |
| 39 | -1 | 1 | 1 | -1 | -1 | 1 | -1 | -1 | 1 |
| 40 | 1 | 1 | 1 | -1 | -1 | 1 | -1 | 1 | 1 |
| 41 | -1 | -1 | -1 | 1 | -1 | 1 | -1 | 1 | -1 |
| 42 | 1 | -1 | -1 | 1 | -1 | 1 | -1 | -1 | 1 |
| 43 | -1 | 1 | -1 | 1 | -1 | 1 | -1 | 1 | -1 |
| 44 | 1 | 1 | -1 | 1 | -1 | 1 | -1 | -1 | 1 |
| 45 | -1 | -1 | 1 | 1 | -1 | 1 | -1 | 1 | -1 |
| 46 | 1 | -1 | 1 | 1 | -1 | 1 | -1 | -1 | -1 |
| 47 | -1 | 1 | 1 | 1 | -1 | 1 | -1 | 1 | -1 |
| 48 | 1 | 1 | 1 | 1 | -1 | 1 | -1 | -1 | 1 |
| 49 | -1 | -1 | -1 | -1 | 1 | 1 | -1 | -1 | -1 |
| 50 | 1 | -1 | -1 | -1 | 1 | 1 | -1 | -1 | -1 |
| 51 | -1 | 1 | -1 | -1 | 1 | 1 | -1 | 1 | 1 |
| 52 | 1 | 1 | -1 | -1 | 1 | 1 | -1 | -1 | 1 |
| 53 | -1 | -1 | 1 | -1 | 1 | 1 | -1 | -1 | -1 |
| 54 | 1 | -1 | 1 | -1 | 1 | 1 | -1 | 1 | 1 |
| 55 | -1 | 1 | 1 | -1 | 1 | 1 | -1 | -1 | -1 |
| 56 | 1 | 1 | 1 | -1 | 1 | 1 | -1 | 1 | 1 |
| 57 | -1 | -1 | -1 | 1 | 1 | 1 | -1 | -1 | -1 |
| 58 | 1 | -1 | -1 | 1 | 1 | 1 | -1 | 1 | -1 |
| 59 | -1 | 1 | -1 | 1 | 1 | 1 | -1 | -1 | 1 |
| 60 | 1 | 1 | -1 | 1 | 1 | 1 | -1 | 1 | 1 |
| 61 | -1 | -1 | 1 | 1 | 1 | 1 | -1 | 1 | 1 |
| 62 | 1 | -1 | 1 | 1 | 1 | 1 | -1 | -1 | 1 |
| 63 | -1 | 1 | 1 | 1 | 1 | 1 | -1 | 1 | -1 |
| 64 | 1 | 1 | 1 | 1 | 1 | 1 | -1 | -1 | -1 |
| 65 | -1 | -1 | -1 | -1 | -1 | -1 | 1 | 1 | 1 |
| 66 | 1 | -1 | -1 | -1 | -1 | -1 | 1 | -1 | 1 |
| 67 | -1 | 1 | -1 | -1 | -1 | -1 | 1 | 1 | -1 |
| 68 | 1 | 1 | -1 | -1 | -1 | -1 | 1 | -1 | -1 |
| 69 | -1 | -1 | 1 | -1 | -1 | -1 | 1 | -1 | -1 |
| 70 | 1 | -1 | 1 | -1 | -1 | -1 | 1 | 1 | -1 |
| 71 | -1 | 1 | 1 | -1 | -1 | -1 | 1 | -1 | 1 |
| 72 | 1 | 1 | 1 | -1 | -1 | -1 | 1 | 1 | 1 |
| 73 | -1 | -1 | -1 | 1 | -1 | -1 | 1 | -1 | 1 |
| 74 | 1 | -1 | -1 | 1 | -1 | -1 | 1 | 1 | 1 |
| 75 | -1 | 1 | -1 | 1 | -1 | -1 | 1 | -1 | -1 |
| 76 | 1 | 1 | -1 | 1 | -1 | -1 | 1 | 1 | -1 |
| 77 | -1 | -1 | 1 | 1 | -1 | -1 | 1 | -1 | -1 |
| 78 | 1 | -1 | 1 | 1 | -1 | -1 | 1 | -1 | -1 |
| 79 | -1 | 1 | 1 | 1 | -1 | -1 | 1 | 1 | 1 |
| 80 | 1 | 1 | 1 | 1 | -1 | -1 | 1 | -1 | 1 |
| 81 | -1 | -1 | -1 | -1 | 1 | -1 | 1 | 1 | -1 |
| 82 | 1 | -1 | -1 | -1 | 1 | -1 | 1 | -1 | -1 |
| 83 | -1 | 1 | -1 | -1 | 1 | -1 | 1 | 1 | 1 |
| 84 | 1 | 1 | -1 | -1 | 1 | -1 | 1 | -1 | 1 |
| 85 | -1 | -1 | 1 | -1 | 1 | -1 | 1 | -1 | 1 |
| 86 | 1 | -1 | 1 | -1 | 1 | -1 | 1 | 1 | 1 |
| 87 | -1 | 1 | 1 | -1 | 1 | -1 | 1 | -1 | -1 |
| 88 | 1 | 1 | 1 | -1 | 1 | -1 | 1 | 1 | -1 |
| 89 | -1 | -1 | -1 | 1 | 1 | -1 | 1 | -1 | -1 |
| 90 | 1 | -1 | -1 | 1 | 1 | -1 | 1 | 1 | -1 |
| 91 | -1 | 1 | -1 | 1 | 1 | -1 | 1 | -1 | 1 |
| 92 | 1 | 1 | -1 | 1 | 1 | -1 | 1 | 1 | 1 |
| 93 | -1 | -1 | 1 | 1 | 1 | -1 | 1 | 1 | 1 |
| 94 | 1 | -1 | 1 | 1 | 1 | -1 | 1 | -1 | 1 |
| 95 | -1 | 1 | 1 | 1 | 1 | -1 | 1 | 1 | -1 |
| 96 | 1 | 1 | 1 | 1 | 1 | -1 | 1 | -1 | -1 |
| 97 | -1 | -1 | -1 | -1 | -1 | 1 | 1 | -1 | -1 |
| 98 | 1 | -1 | -1 | -1 | -1 | 1 | 1 | -1 | -1 |
| 99 | -1 | 1 | -1 | -1 | -1 | 1 | 1 | 1 | 1 |
| 100 | 1 | 1 | -1 | -1 | -1 | 1 | 1 | -1 | 1 |
| 101 | -1 | -1 | 1 | -1 | -1 | 1 | 1 | 1 | 1 |
| 102 | 1 | -1 | 1 | -1 | -1 | 1 | 1 | -1 | 1 |
| 103 | -1 | 1 | 1 | -1 | -1 | 1 | 1 | 1 | -1 |
| 104 | 1 | 1 | 1 | -1 | -1 | 1 | 1 | -1 | -1 |
| 105 | -1 | -1 | -1 | 1 | -1 | 1 | 1 | 1 | -1 |
| 106 | 1 | -1 | -1 | 1 | -1 | 1 | 1 | -1 | -1 |
| 107 | -1 | 1 | -1 | 1 | -1 | 1 | 1 | 1 | 1 |
| 108 | 1 | 1 | -1 | 1 | -1 | 1 | 1 | -1 | 1 |
| 109 | -1 | -1 | 1 | 1 | -1 | 1 | 1 | -1 | 1 |
| 110 | 1 | -1 | 1 | 1 | -1 | 1 | 1 | 1 | 1 |
| 111 | -1 | 1 | 1 | 1 | -1 | 1 | 1 | -1 | -1 |
| 112 | 1 | 1 | 1 | 1 | -1 | 1 | 1 | 1 | -1 |
| 113 | -1 | -1 | -1 | -1 | 1 | 1 | 1 | -1 | 1 |
| 114 | 1 | -1 | -1 | -1 | 1 | 1 | 1 | 1 | 1 |
| 115 | -1 | 1 | -1 | -1 | 1 | 1 | 1 | -1 | -1 |
| 116 | 1 | 1 | -1 | -1 | 1 | 1 | 1 | 1 | -1 |
| 117 | -1 | -1 | 1 | -1 | 1 | 1 | 1 | 1 | -1 |
| 118 | 1 | -1 | 1 | -1 | 1 | 1 | 1 | -1 | -1 |
| 119 | -1 | 1 | 1 | -1 | 1 | 1 | 1 | 1 | 1 |
| 120 | 1 | 1 | 1 | -1 | 1 | 1 | 1 | -1 | 1 |
| 121 | -1 | -1 | -1 | 1 | 1 | 1 | 1 | 1 | 1 |
| 122 | 1 | -1 | -1 | 1 | 1 | 1 | 1 | -1 | 1 |
| 123 | -1 | 1 | -1 | 1 | 1 | 1 | 1 | 1 | -1 |
| 124 | 1 | 1 | -1 | 1 | 1 | 1 | 1 | -1 | -1 |
| 125 | -1 | -1 | 1 | 1 | 1 | 1 | 1 | -1 | -1 |
| 126 | 1 | -1 | 1 | 1 | 1 | 1 | 1 | 1 | -1 |
| 127 | -1 | 1 | 1 | 1 | 1 | 1 | 1 | -1 | 1 |
| 128 | 1 | 1 | 1 | 1 | 1 | 1 | 1 | 1 | 1 |
| 129 | -1 | 0 | 0 | 0 | 0 | 0 | 0 | 0 | 0 |
| 130 | 1 | 0 | 0 | 0 | 0 | 0 | 0 | 0 | 0 |
| 131 | 0 | -1 | 0 | 0 | 0 | 0 | 0 | 0 | 0 |
| 132 | 0 | 1 | 0 | 0 | 0 | 0 | 0 | 0 | 0 |
| 133 | 0 | 0 | -1 | 0 | 0 | 0 | 0 | 0 | 0 |
| 134 | 0 | 0 | 1 | 0 | 0 | 0 | 0 | 0 | 0 |
| 135 | 0 | 0 | 0 | -1 | 0 | 0 | 0 | 0 | 0 |
| 136 | 0 | 0 | 0 | 1 | 0 | 0 | 0 | 0 | 0 |
| 137 | 0 | 0 | 0 | 0 | -1 | 0 | 0 | 0 | 0 |
| 138 | 0 | 0 | 0 | 0 | 1 | 0 | 0 | 0 | 0 |
| 139 | 0 | 0 | 0 | 0 | 0 | -1 | 0 | 0 | 0 |
| 140 | 0 | 0 | 0 | 0 | 0 | 1 | 0 | 0 | 0 |
| 141 | 0 | 0 | 0 | 0 | 0 | 0 | -1 | 0 | 0 |
| 142 | 0 | 0 | 0 | 0 | 0 | 0 | 1 | 0 | 0 |
| 143 | 0 | 0 | 0 | 0 | 0 | 0 | 0 | -1 | 0 |
| 144 | 0 | 0 | 0 | 0 | 0 | 0 | 0 | 1 | 0 |
| 145 | 0 | 0 | 0 | 0 | 0 | 0 | 0 | 0 | -1 |
| 146 | 0 | 0 | 0 | 0 | 0 | 0 | 0 | 0 | 1 |
| 147 | 0 | 0 | 0 | 0 | 0 | 0 | 0 | 0 | 0 |
| 148 | 0 | 0 | 0 | 0 | 0 | 0 | 0 | 0 | 0 |
| 149 | 0 | 0 | 0 | 0 | 0 | 0 | 0 | 0 | 0 |
| 150 | 0 | 0 | 0 | 0 | 0 | 0 | 0 | 0 | 0 |
| 151 | 0 | 0 | 0 | 0 | 0 | 0 | 0 | 0 | 0 |
| 152 | 0 | 0 | 0 | 0 | 0 | 0 | 0 | 0 | 0 |
| 153 | 0 | 0 | 0 | 0 | 0 | 0 | 0 | 0 | 0 |
| 154 | 0 | 0 | 0 | 0 | 0 | 0 | 0 | 0 | 0 |
| 155 | 0 | 0 | 0 | 0 | 0 | 0 | 0 | 0 | 0 |
| 156 | 0 | 0 | 0 | 0 | 0 | 0 | 0 | 0 | 0 |

Based on the design of the second experiment as illustrated above (Table 4), a second set of print instructions 14, B is generated, which may be communicated to the AM module 12. The second set of print instructions 14, B, in this case, specifies the number of experimental print runs (in this example, 156) and also specifies the level or value of each parameter $X_5, X_6, X_7, X_{10}, X_{11}, X_{12}, X_{15}, X_{16}$ in the subset set of significant process parameters, for each print run, as illustrated in Table 4. Based on the second set of print instructions 14, B, the AM module 12 executes a second plurality of experimental print runs (in this example, 156 print runs). For each of these print runs, the defined set of target output material properties is measured at the measurement module 13. A second output response is thereby obtained from measurement data 16, B from the measurement module 13 pertaining to the second set of experimental print runs. Based on the second output response derived from the measurement data 16, B, the processing block 25 (see FIG. 2) involves determining optimal values for each significant process parameter in said subset of significant process parameters, for which a maximization or minimization of the target output material properties is predicted.

In the present example embodiment, the processing at block 25 involves a simplex optimization method to obtain the optimal parameters values. As an example, the method may comprise performing a Nelder-Mead optimization on a fitted regression model of the measured output response of the second plurality of experimental print runs in relation to the significant process parameters. In general, a Nelder-Mead algorithm works on minimization of a function with n variables by choosing n+1 points ($P_n$) in an n-dimensional space by constructing simplexes. For a detailed understanding of the algorithm, the following document may be referenced: J. A. Nelder and R. Mead, "A Simplex Method for Function Minimization," *Comput. J*, 1965. One skilled in the art would appreciate that alternate optimization techniques could be utilized to determine the optimal parameter values.

The objective of the optimization algorithm may be defined in terms of a desirability function. In the present embodiment, the defined set of target output material properties includes a set of three properties, namely: density, hardness and surface roughness. In an exemplary scenario, a maximum value may be desired for density and hardness while a minimum value may be desired for roughness. One example approach may involve performing optimization on individual fits for various responses. In another approach, using the sum of individual fits, where density and hardness appear as positive terms while roughness appears as a negative term, may be used to find the optimal values. A common approach is to define a desirability function D which combines the individual fits from various responses. In this approach, fits from various responses are normalized and multiplied with a power function. For more a more detailed understanding of the above-mentioned desirability function, reference may be made to the document: G. Derringer and R. Suich, "Simultaneous-Optimization of Several Response Variables," *J. Qual. Technol.*, 1980.

Figure 6:
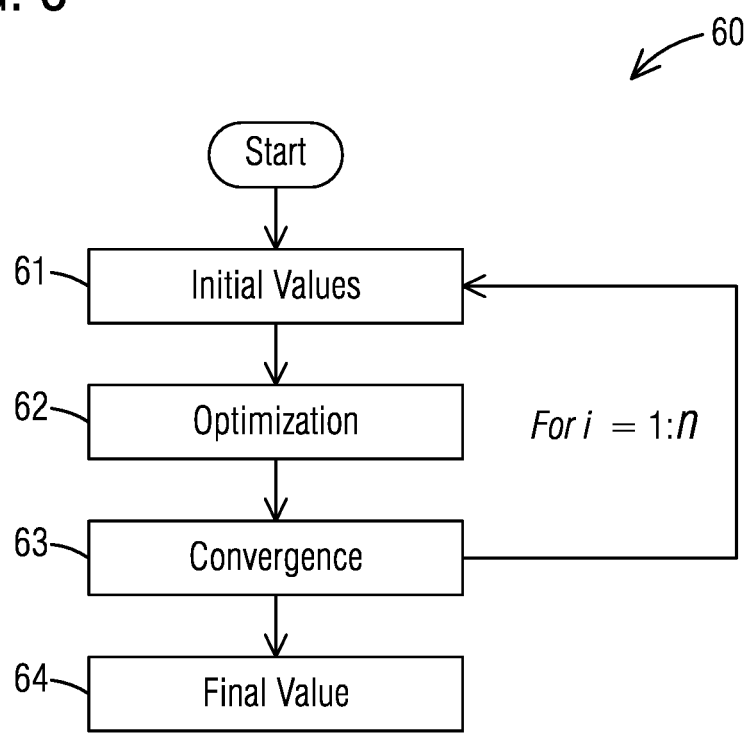
FIG. 6 is a flowchart illustrating an example embodiment of an optimization methodology.

FIG. 6 illustrates an optimization method 60 according to one embodiment of the invention. The method 60 starts with determining initial values of the significant process parameters (block 61). In the present example, as the desirability function D consists of a combination of multiple quadratic fits, an exhaustive search with a large number of initial values may be performed by all possible combinations of significant process parameters, to obtain the global optima. In the present embodiment, five equally spaced initial value combinations, normalized between −1 and 1, are used for each significant process parameter. Subsequently, an optimization may be performed, for example based on a Nelder-Mead algorithm or any other method (block 62) for each initial value set until convergence is reached (block 63). The above steps are repeated for n iterations (in this example, $n=5^9$) until all possibilities are exhausted, after which a final parameter value is obtained (block 64).

Turning back to FIG. 2, as an optional feature, the method 20 may include a validation phase C to validate the optimized input values with expected or predicted output values of the responses to evaluate the effectiveness of the present methodology and provide relevant confidence or prediction intervals. The validation phase C thereby mitigates the risk resulting from the effect external factors and other physical phenomena on the results obtained in the optimization phase B.

The validation phase C involves, at processing block 26, determining a number of replicates (repeat print runs) required for the defined set of target output material properties. The number of replicates necessary for each response are dependent on the confidence level and effect size within the measurement. In a non-limiting example embodiment, the number of replicates may be calculated as:

$$n=(Z_\alpha+Z_\beta)^2\sigma^2/\delta^2$$

where n is the number of replicates, a is the standard deviation estimated from the residuals, δ is the expected error from the experimental measurements and $Z_\alpha$, $Z_\beta$ are the 97.5% quantiles of the normal distribution.

In this case, the number of replicates n may be determined separately for each target output material property. The total number of replicates for a given set of target output material properties may be determined based on the maximum calculated value of n. For example, if 8 replicates were determined each for hardness and roughness while only 5 replicates were determined for density, the total number of replicates necessary for the set density-hardness-roughness would be 8.

Based on the determined number of replicates at block 26, a third set of print instructions 14, C are generated, which may be communicated to the AM module 12. The third set of print instructions 14, C, in this case, specifies the number of print runs (i.e., the number of replicates determined) and also specifies the determined optimal values of each of the significant parameters $X_5$, $X_6$, $X_7$, $X_{10}$, $X_{11}$, $X_{12}$, $X_{15}$, $X_{16}$. Based on the third set of print instructions 14, C, the AM module 12 executes a third plurality of validation print runs (in this example, 8 print runs). For each of these print runs, the defined set of target output material properties is measured at the measurement module 13. A third output response is thereby obtained from measurement data 16, C from the measurement module 13 pertaining to the third set of validation print runs. Based on the third output response derived from the measurement data 16, C, the processing block 27 (see FIG. 2) involves validating the optimization based on a comparison of the third output response with a defined prediction interval and/or confidence interval.

In general, it may be possible to validate a model based solely on prediction intervals. However, as confidence intervals for expected mean values offer a much tighter bounds, it may be desirable to validate the experimental results with both the prediction and confidence intervals. In addition, comparing the observed mean of the validation response values with the confidence intervals provide information about the data skewness or bias. Confidence intervals may be calculated using any known statistical method, for example, as disclosed in the document: D. Montgomery, "Design and Analysis of Experiments". 2001.

A further aspect of the invention may involve a production phase, in which a part having optimized target output material properties may be produced by an AM process from a specified process material. The production phase may involve executing one or more production print runs based on optimal parameter values of significant process parameters that are determined by a method according to any of the above-described embodiments.

Aspects of the present invention may be embodied as a computer readable medium or multiple computer readable media encoded with one or more programs that, when executed on one or more computers or other processors, perform methods that implement the various embodiments of the invention discussed above. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Non-exhaustive examples of computer readable media include a computer memory (e.g. a RAM or a ROM), compact discs, optical discs, hard discs, magnetic tapes, flash memories, etc. The computer readable medium or media may be transportable, such that the program or programs stored thereon can be loaded onto one or more different computers or other processors to implement various aspects of the present invention as discussed above.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A method for determining optimal values of significant process parameters in an additive manufacturing (AM) process for printing a part from a specified process material, comprising:
    defining a set of target output material properties to be optimized,
    identifying an initial set of process parameters pertaining to the AM process,
    a screening phase comprising:
        executing a first plurality of experimental print runs based on a first experiment design applied to said initial set of process parameters,
        obtaining a first output response by measuring the target output material properties for each print run,
        based on the first output response, determining, from said initial set of process parameters, a subset of process parameters that affect the target output material properties, and
        an optimization phase comprising:
    executing a second plurality of experimental print runs based on a second experiment design applied to said subset of process parameters,
    obtaining a second output response by measuring the target output material properties for each print run, and
    based on the second output response, determining optimal values for each process parameter in said subset of process parameters, for which a maximization or minimization of the target output material properties is predicted,
    wherein the first experiment design comprises a two-level Placket Burman design, involving at least a "low" level and a "high" level of each of the parameters of the initial set of process parameters,
    wherein the number of first experimental print runs is at least k+1, and
    where k is the number of process parameters in the initial set of process parameters.

2. The method according to claim 1,
    wherein the first experiment design additionally includes a plurality of center point based experimental print runs, involving a "mid" level for at least some of the parameters of the initial set of process parameters.

3. The method according to claim 1,
    wherein said levels of the initial set of process parameters are determined through analytical modeling.

4. The method according to claim 1,
    wherein determining the subset of process parameters that affect the target output material properties from the initial set of process parameters comprises performing a regression model fit of the measured output response of the first plurality of experimental print runs in relation to the process parameters of the initial set of process parameters.

5. The method according to claim 1,
    wherein the second experiment design comprises a central composite design.

6. The method according to claim 5,
    wherein the central composite design involves three levels of each of said process parameters, defined respectively by a "high" level, a "mid" level and a "low" level,
    wherein, in a factorial space of the central composite design:
        center points are defined by said "mid" levels of the respective process parameters, and
        additional points for estimating curvature are defined at edges of the factorial space.

7. The method according to claim 1,
    wherein determining the optimal values for each process parameter comprises: performing a Nelder-Mead optimization on a fitted regression model of the measured output response of the second plurality of experimental print runs in relation to the process parameters.

8. The method according to claim 1, further comprising a validation phase, comprising:
    determining a number of replicates required for each target output material property,
    based on the determined number of replicates, executing a third plurality of validation print runs using the determined optimal values of said process parameters,
    obtaining a third output response by measuring the target output material properties of each print run, and
    validating the optimization based on a comparison of the third output response with a defined prediction interval and/or confidence interval.

9. The method according to claim 1,
    wherein the AM process comprises a laser powder-bed fusion (LPBF) process.

10. The method according to claim 9,
    wherein the initial process parameters comprise at least one of: a pre-exposure parameter, a post-exposure parameter, a core parameter, and a skin parameter.

11. The method according to claim 9,
    wherein the set of initial process parameters comprise at least one qualitive parameter.

12. The method according to claim 1,
    wherein said set of target output material properties to be optimized comprises at least one of: density, hardness, roughness, mechanical yield strength, stiffness and fatigue life.

* * * * *